US008561562B2

(12) United States Patent
Takano et al.

(10) Patent No.: US 8,561,562 B2
(45) Date of Patent: Oct. 22, 2013

(54) DEVICE FOR REDUCING FRICTIONAL RESISTANCE OF SHIP BODY

(75) Inventors: Shinichi Takano, Nagasaki (JP); Chiharu Kawakita, Nagasaki (JP); Seijiro Higasa, Nagasaki (JP); Shuji Mizokami, Tokyo (JP); Shoichi Kameyama, Nagasaki (JP); Takashi Mine, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 259 days.

(21) Appl. No.: 13/063,265

(22) PCT Filed: Feb. 18, 2009

(86) PCT No.: PCT/JP2009/052816
§ 371 (c)(1),
(2), (4) Date: Mar. 10, 2011

(87) PCT Pub. No.: WO2010/058614
PCT Pub. Date: May 27, 2010

(65) Prior Publication Data
US 2011/0168078 A1    Jul. 14, 2011

(30) Foreign Application Priority Data

Nov. 21, 2008   (JP) ................................. 2008-298727

(51) Int. Cl.
*B63B 1/38*   (2006.01)
(52) U.S. Cl.
USPC ....................................................... 114/67 A
(58) Field of Classification Search
USPC ....................................................... 114/67 A
See application file for complete search history.

(56) References Cited

U.S. PATENT DOCUMENTS

| 1,121,006 A | 12/1914 | Fauber |
| 3,874,315 A | 4/1975 | Wright |

(Continued)

FOREIGN PATENT DOCUMENTS

| CN | 1109681 | 10/1995 |
| CN | 1209405 | 3/1999 |

(Continued)

OTHER PUBLICATIONS

Japanese Decision of a Patent Grant issued May 29, 2012 in corresponding Japanese Patent Application No. 2008-298727 with English translation.

(Continued)

*Primary Examiner* — Lars A Olson
*Assistant Examiner* — Anthony Wiest
(74) *Attorney, Agent, or Firm* — Wenderoth, Lind & Ponack, L.L.P.

(57) ABSTRACT

In a friction reducing device for a ship body by forming an air bubble curtain on a ship's bottom by generating air bubbles from air ejection holes formed on the bottom, the air ejection holes are arranged in a ship width direction to constitute a plurality of air-ejection hole groups. The air-ejection hole groups include at least a center air-ejection hole group formed at the center of the ship width direction at a bow side and a pair of side air-ejection hole groups formed at a stern side from the center air-ejection hole group at both sides of the center air-ejection hole group in the ship width direction. A length of the center air-ejection hole group in the ship width direction is formed to be longer than a length of each of the side air-ejection hole groups in the ship width direction.

4 Claims, 7 Drawing Sheets

(56) References Cited

U.S. PATENT DOCUMENTS

| | | | |
|---|---|---|---|
| 4,587,918 A | | 5/1986 | Burg |
| 5,456,201 A | * | 10/1995 | Bobst ........................... 114/289 |
| 5,575,232 A | * | 11/1996 | Kato et al. ................... 114/67 A |
| 6,145,459 A | * | 11/2000 | Takahashi et al. .......... 114/67 A |

FOREIGN PATENT DOCUMENTS

| | | |
|---|---|---|
| JP | 50-58791 | 5/1975 |
| JP | 50-78092 | 6/1975 |
| JP | 62-143595 | 9/1987 |
| JP | 8-239083 | 9/1996 |
| JP | 10-24891 | 1/1998 |
| JP | 10-175588 | 6/1998 |
| JP | 11-227675 | 8/1999 |
| JP | 11-348871 | 12/1999 |
| JP | 2008-114710 | 5/2008 |
| JP | 2009-248611 | 10/2009 |

OTHER PUBLICATIONS

Supplementary European Search Report issued Apr. 5, 2013 in corresponding European Patent Application No. 09827395.6.
International Search Report issued May 26, 2009 in International (PCT) Application No. PCT/JP2009/052816.
Written Opinion of the International Searching Authority issued May 26, 2009 in International (PCT) Application No. PCT/JP2009/052816 w/English translation.
Chinese Office Action and Search Report dated Apr. 3, 2013 in corresponding Chinese Patent Application No. 200980143089.4 with English translation.

* cited by examiner

DEVICE FOR REDUCING FRICTIONAL RESISTANCE OF SHIP BODY

TECHNICAL FIELD

The present invention relates to a ship-body frictional resistance reducing device for reducing frictional resistance of a sailing ship body by forming an air bubble curtain on a ship's bottom by generating air bubbles from a plurality of air ejection holes formed on the ship's bottom.

BACKGROUND ART

An air ejection device for a frictional-resistance reducing ship has been known, which is formed by arranging a plurality of air ejection units in a ship width direction on an outer plate of a ship's bottom (see, for example, Patent Document 1). In this air ejection device for the frictional-resistance reducing ship, the air ejection units are arranged in a staggered manner in the ship width direction, by which an enhancement of strength of a ship body is achieved.

In addition, a ship-body frictional resistance reducing device is described in Patent Document 2, in which a plurality of air ejection holes are formed on an outer plate portion of a ship's bottom. In this ship-body frictional resistance reducing device, an air chamber formed inside a ship in the ship width direction on a bottom of a bow of the ship is provided, and a pair of air-bubble generating side air chambers is provided at left and right sides slightly behind the air chamber. Each of the air chambers is divided into a plurality of sub-chambers, and the air ejection holes are formed on the outer plate portion of the ship's bottom corresponding to each of the sub-chambers.

Patent Document 1: Japanese Patent Application Laid-open No. H11-227675
Patent Document 1: Japanese Patent Application Laid-open No. 2008-114710

SUMMARY OF THE INVENTION

Problem to be Solved by the Invention

However, in the air ejection device for the frictional-resistance reducing ship described in Patent Document 1, the air ejection units are generally formed in a line across the whole width of the ship in the ship width direction. Therefore, even though the air ejection units are arranged in the staggered manner in the ship width direction, it is hard to greatly enhance the strength of the ship body.

Furthermore, in the ship-body frictional resistance reducing device described in Patent Document 2, the air chamber and the pair of the air-bubble generating side air chambers are arranged with the same width in the ship width direction. Therefore, the air chamber and the pair of the air-bubble generating side air chambers make an air bubble curtain formed on the bottom of the ship body with the same width. However, with this configuration, an area of forming the air bubble curtain on the ship's bottom at the bow side becomes narrow, resulting in a possibility that the frictional resistance of the ship body is not sufficiently reduced at the bow side.

To handle this problem, an object of the present invention is to provide a ship-body frictional resistance reducing device that can increase the area of forming the air bubble curtain on the ship's bottom while suppressing degradation of the strength of the ship body.

Means for Solving Problem

According to an aspect of the present invention, a ship-body frictional resistance reducing device for reducing frictional resistance of a sailing ship body by forming an air bubble curtain on a ship's bottom by generating air bubbles from a plurality of air ejection holes formed on the ship's bottom includes a plurality of air-ejection hole groups formed on the ship's bottom, each of the air-ejection hole groups being configured with the air ejection holes arranged in a ship width direction of the ship body. The air-ejection hole groups include at least a center air-ejection hole group formed at a center of the ship width direction at a bow side and a pair of side air-ejection hole groups formed at a stern side from the center air-ejection hole group at both sides of the center air-ejection hole group in the ship width direction, and a length of the center air-ejection hole group in the ship width direction is formed to be longer than a length of each of the side air-ejection hole groups in the ship width direction.

Advantageously, the ship-body frictional resistance reducing device further includes: an air supply source configured to supply an air to the air ejection holes; and an air supply path that connects the air supply source and the air ejection holes. The air supply source is arranged at the bow side of the ship body.

Advantageously, in the ship-body frictional resistance reducing device, the ship's bottom of the ship body is formed in a flat surface, and the air-ejection hole groups are formed on the ship's bottom that is formed in the flat surface.

Effect of the Invention

According to a first aspect of the ship-body frictional resistance reducing device, it is possible to form the length of the center air-ejection hole group in the ship width direction longer than the length of the side air-ejection hole group in the ship width direction. Therefore, because the air bubbles ejected from the center air-ejection hole group can be broadened in the ship width direction of the bow side, it is possible to expand an area of forming the air bubble curtain at the bow side.

According to a second aspect of the ship-body frictional resistance reducing device, because the air supply source and the center air-ejection hole group can be arranged at the bow side by arranging the air supply source at the bow side of the ship body, it is possible to shorten a distance between the air supply source and the center air-ejection hole group. At this time, because the length of the center air-ejection hole group in the ship width direction is longer than that of the side air-ejection hole group, a routing of the air supply path for the center air-ejection hole group becomes more complicated than a routing of the air supply path for the side air-ejection hole group. In this case, because the distance between the air supply source and the center air-ejection hole group can be shortened, it is possible to simplify the routing of the air supply path for the center air-ejection hole group as the distance is shortened. In addition, because the length of the side air-ejection hole group in the ship width direction is short, it is also possible to simplify the routing of the air supply path for the side air-ejection hole group.

According to a third aspect of the ship-body frictional resistance reducing device, because a plurality of air-ejection hole groups can be formed on the ship's bottom that makes a flat surface, it is possible to achieve a uniformity in a thickness of the air bubble curtain formed on the ship's bottom.

Figure 1:
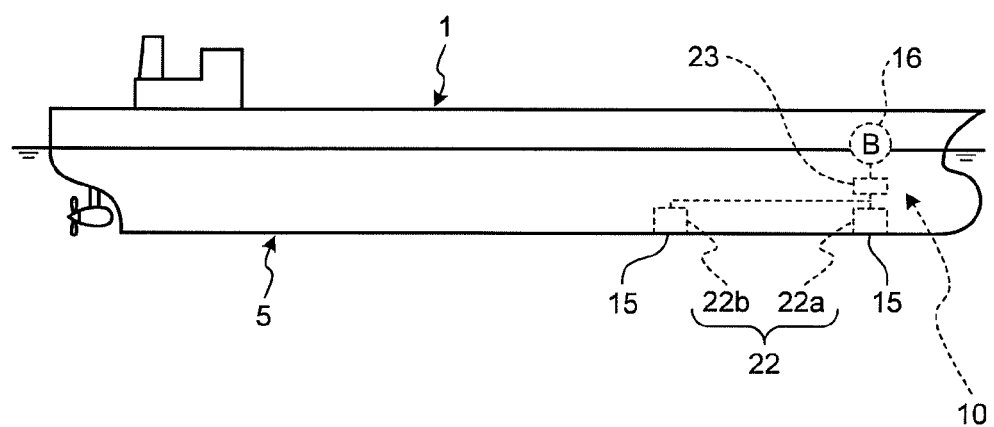
FIG. 1 is a side view schematically depicting a ship body having incorporated thereon a ship-body frictional resistance reducing device according to a first embodiment.

EXPLANATIONS OF LETTERS OR NUMERALS 1 ship body
5 ship's bottom
10 ship-body frictional resistance reducing device
15 air ejection hole
16 blower
17 air supply path
20 main supply pipe
21 branch supply pipe
22 air chamber
22a center air chamber
22b side air chamber
23 primary air tank
24 air flow meter
25 on-off valve
30a center air-ejection hole group
30b side air-ejection hole group
50 ship-body frictional resistance reducing device (second embodiment)
55 center air-ejection hole group (second embodiment)
56 first side air-ejection hole group (second embodiment)
57 second side air-ejection hole group (second embodiment)
70 ship-body frictional resistance reducing device (third embodiment)
71a air ejection unit at bow side
71b air ejection unit at stern side
80a stern-side center air-ejection hole group
80b stern-side side air-ejection hole group
L1 width of center air-ejection hole group (first embodiment)
L2 width of side air-ejection hole group (first embodiment)
L3 width of center air-ejection hole group (second embodiment)
L4 width of first side air-ejection hole group (second embodiment)
L5 width of second side air-ejection hole group (second embodiment)

DETAILED DESCRIPTION OF THE INVENTION

Exemplary embodiments of a ship-body frictional resistance reducing device according to the present invention will be explained below in detail with reference to the accompanying drawings. The present invention is not limited to the embodiments. In addition, constituent elements in the following embodiments include those that can be easily replaceable by persons skilled in the art or that are substantially equivalent.

First Embodiment

Figure 2:
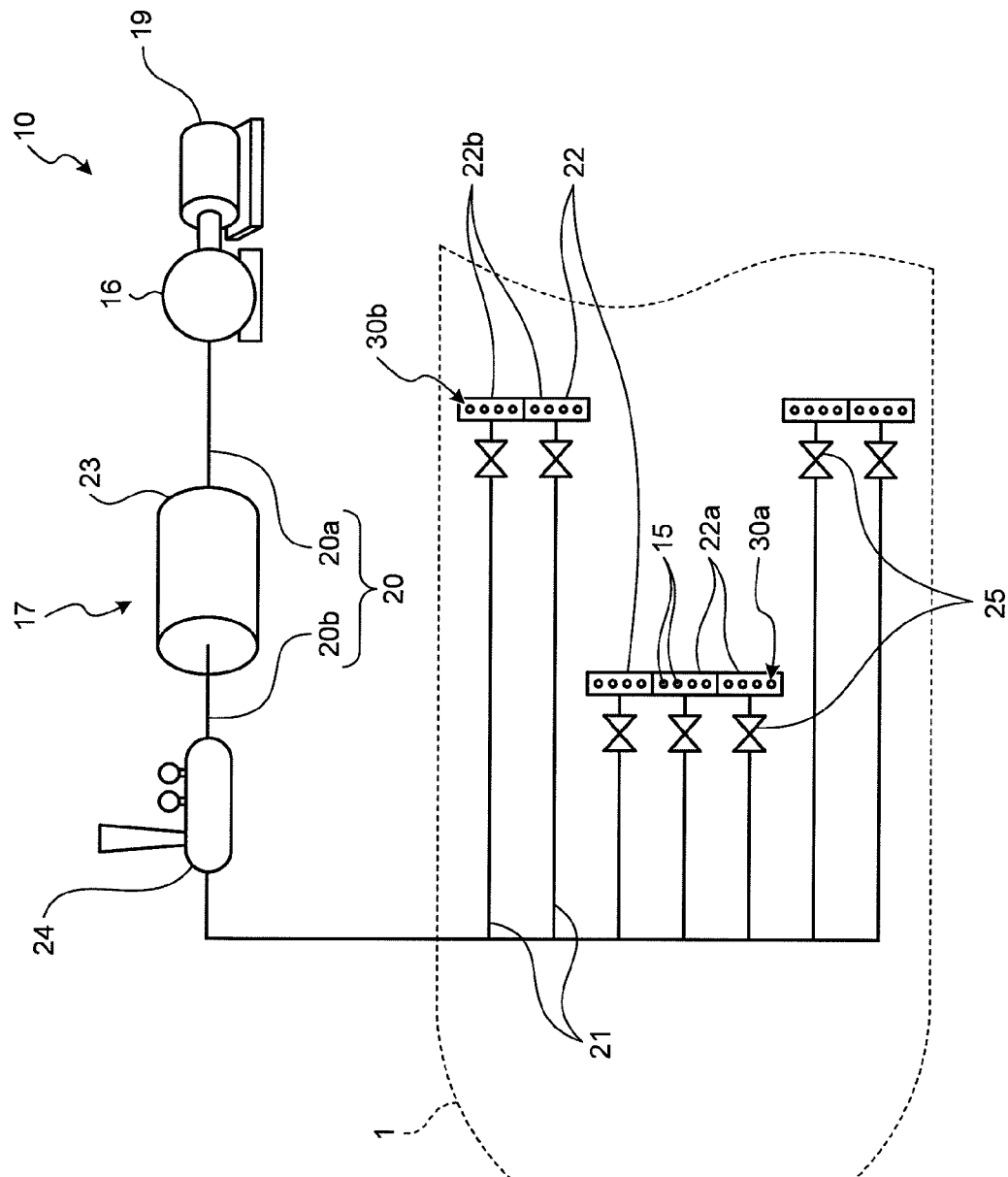
FIG. 2 is an explanatory diagram of a configuration of the ship-body frictional resistance reducing device according to the first embodiment.
Figure 3:
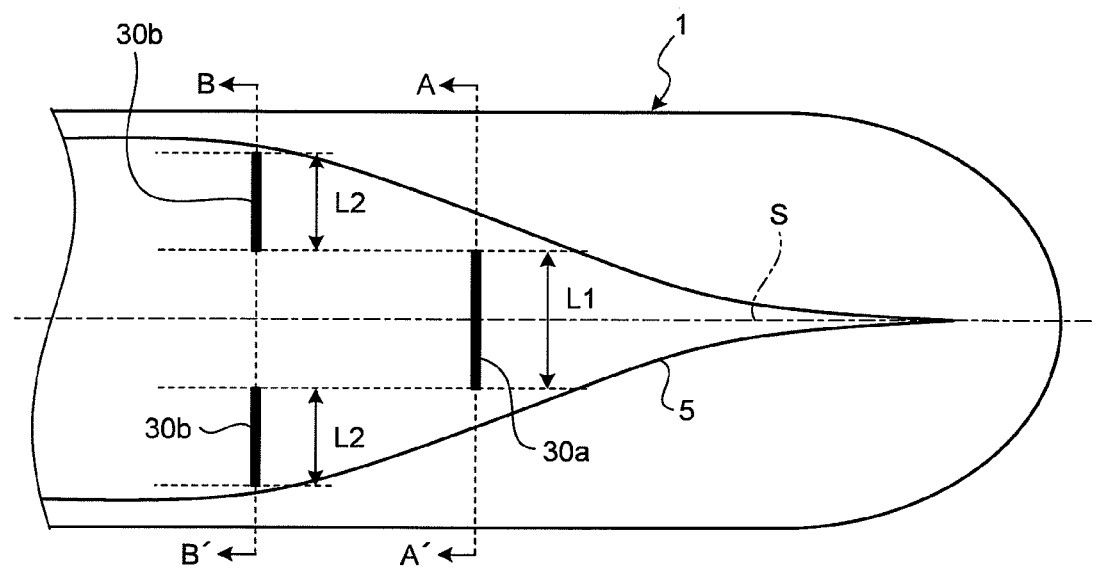
FIG. 3 is a bottom view schematically depicting a ship's bottom of a ship body having incorporated thereon the ship-body frictional resistance reducing device according to the first embodiment.
Figure 4:
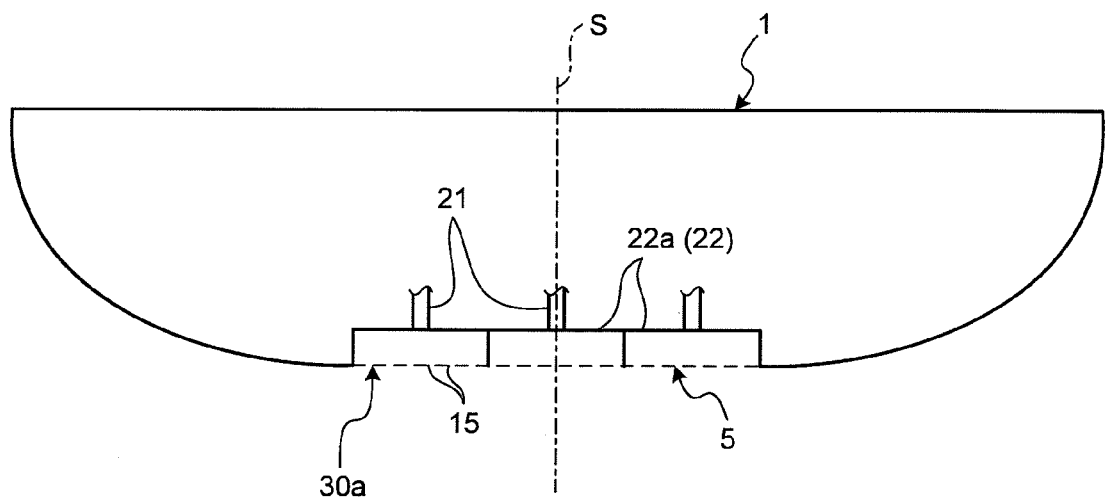
FIG. 4 is a cross-sectional view of a ship body depicting a center air-ejection hole group cut along a line A-A' shown in FIG. 3.
Figure 5:
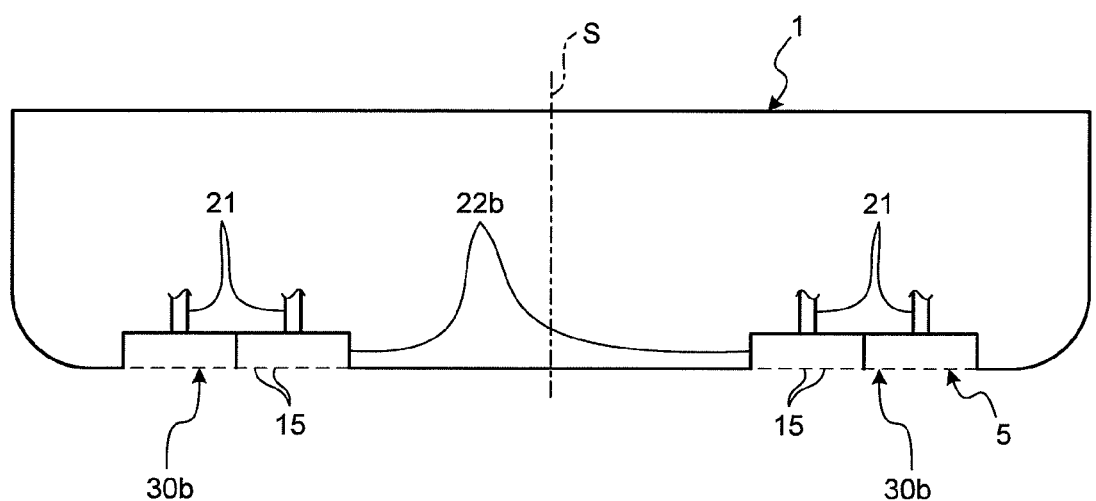
FIG. 5 is a cross-sectional view of a ship body depicting a pair of side air-ejection hole groups cut along a line B-B' shown in FIG. 3.
Figure 6:
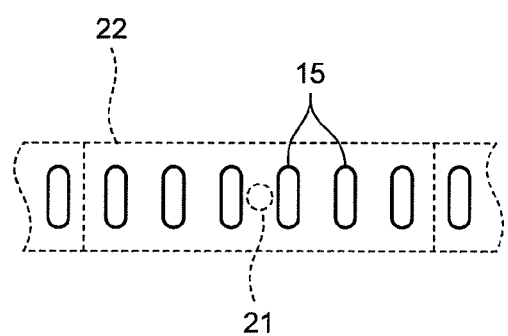
FIG. 6 is a plan view of shapes and arrangement of first air ejection holes in each of the air-ejection hole groups.
Figure 7:
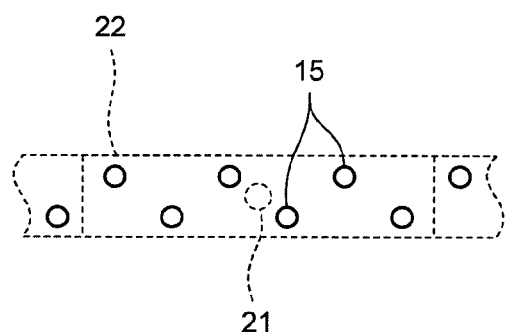
FIG. 7 is a plan view of shapes and arrangement of second air ejection holes in each of the air-ejection hole groups.
Figure 8:
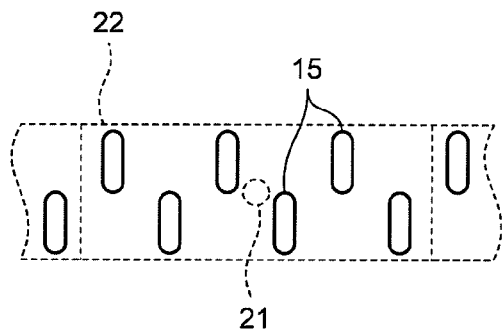
FIG. 8 is a plan view of shapes and arrangement of third air ejection holes in each of the air-ejection hole groups.

FIG. 1 is a side view schematically depicting a ship body having incorporated thereon a ship-body frictional resistance reducing device according to a first embodiment; FIG. 2 is an explanatory diagram of a configuration of the ship-body frictional resistance reducing device according to the first embodiment; FIG. 3 is a bottom view schematically depicting a ship's bottom of the ship body having incorporated thereon the ship-body frictional resistance reducing device according to the first embodiment; FIG. 4 is a cross-sectional view of the ship body depicting a center air-ejection hole group cut along a line A-A' shown in FIG. 3; FIG. 5 is a cross-sectional view of the ship body depicting a pair of side air-ejection hole groups cut along a line B-B' shown in FIG. 3. Further, FIG. 6 is a plan view of shapes and arrangement of first air ejection holes in each of the air-ejection hole groups; FIG. 7 is a plan view of shapes and arrangement of second air ejection holes in each of the air-ejection hole groups; and FIG. 8 is a plan view of shapes and arrangement of third air ejection holes in each of the air-ejection hole groups.

A ship-body frictional resistance reducing device 10 according to the first embodiment reduces a frictional resistance of a sailing ship body 1 by forming an air bubble curtain on a ship's bottom 5 by generating air bubbles from a plurality of air ejection holes 15 formed on the ship's bottom 5. As shown in FIG. 1, the ship body 1 having incorporated thereon the ship-body frictional resistance reducing device 10 is, for example, a flat-bottomed ship in which the ship's bottom 5 is flat, and the ship-body frictional resistance reducing device 10 is arranged on a bow side of the ship body 1. However, the ship-body frictional resistance reducing device 10 is not limited to be applied to the flat-bottomed ship, but also can be applied to other types of ships.

The ship-body frictional resistance reducing device 10 is explained below with reference to FIG. 1 and FIG. 2. The ship-body frictional resistance reducing device 10 includes the air ejection holes 15 formed on the ship's bottom 5, a blower 16 (air supply source) that can supply the air to the air ejection holes 15, and an air supply path 17 that connects the blower 16 and the air ejection holes 15.

The blower 16 is arranged on the bow side of the ship body 1, serving as an air supply source that can supply the air to the air ejection holes 15. An electric motor 19 is employed as a driving source for the blower 16, and an amount of supplying the air sent from the blower 16 can be controlled by controlling a rotation speed of the electric motor 19. Although details are described later, a distance between the blower 16 and a center air-ejection hole group 30a is shorter than a distance between the blower 16 and each of side air-ejection hole groups 30b and 30b, so that both the blower 16 and the center air-ejection hole group 30a are arranged on the bow side of the ship body 1. The air supply source is not limited to the blower 16, but can be an air compressor or the like. Furthermore, although the air supply source is configured with a single unit of the blower 16 according to the first embodiment, the air supply source is not limited to this configuration, but also can be configured with a plurality of blowers 16.

The air supply path 17 includes a main supply pipe 20 of which one end is connected to the blower 16, a plurality of branch supply pipes 21 connected to the main supply pipe 20, and a plurality of air chambers 22 respectively connected to the branch supply pipes 21. A primary air tank 23 is provided on the main supply pipe 20. That is, the main supply pipe 20 is configured with an upstream-side main supply pipe 20*a* connecting the blower 16 and the primary air tank 23 and a downstream-side main supply pipe 20*b* connecting the primary air tank 23 and the branch supply pipes 21. An air flow meter 24 for measuring a flow rate of the air flowing through the downstream-side main supply pipe 20*b* is provided on the downstream-side main supply pipe 20*b*, and an on-off valve 25 for opening and closing the pipe is provided on each of the branch supply pipes 21.

The primary air tank 23 is configured to store the air supplied from the blower 16 via the upstream-side main supply pipe 20*a*. By providing the primary air tank 23 on the main supply pipe 20, it is possible to alleviate a pressure change of the air (a so-called pulsation of the air) generated at the blower 16 and the upstream-side main supply pipe 20*a*.

Each of the air chambers 22 is formed in a box shape of a rectangular cuboid, and is arranged corresponding to each of the air ejection holes 15 formed on the ship's bottom 5. Although details are described later, some of the air chambers 22 (a plurality of center air chambers 22*a* described later) are arranged inside the ship's bottom 5 on the bow side of the ship body 1, and the others (a plurality of side air chambers 22*b* described later) are arranged inside the ship's bottom 5 near the center of the ship body 1.

The air flow meter 24 measures, as described above, the flow rate of the air flowing through the downstream-side main supply pipe 20*b*. Based on a result of measurement of the air flow meter 24, an amount of supplying the air supplied from the blower 16 is controlled.

A plurality of on-off valves 25 respectively provided on the branch supply pipes 21 functions as a so-called check valve, which is installed for preventing an infiltration of seawater into the air supply path 17 on the upstream side from the on-off valves 25. Specifically, when an operation of the ship-body frictional resistance reducing device 10 is stopped, that is, when the driving of the blower 16 is stopped, the ejection of the air from each of the air ejection holes 15 is stopped. This causes the seawater to flow into each of the air chambers 22 via each of the air ejection holes 15. At this moment, because each of the air chambers 22 interlocks with each of the branch supply pipes 21, the infiltration of the seawater into each of the branch supply pipes 21 on the upstream side from the on-off valves 25 is prevented by closing each of the on-off valves 25.

Therefore, when the blower 16 is driven, the air blown out from the blower 16 flows into the primary air tank 23 through the upstream-side main supply pipe 20*a*, and thereafter the air flows into each of the air chambers 22 via the downstream-side main supply pipe 20*b* and the branch supply pipes 21. At this moment, the amount of supplying the air from the blower 16 is adjusted by controlling the electric motor 19 based on the result of measurement of the air flow meter 24.

The air ejection holes 15, which are characteristic parts of the present invention, are explained next. Because the air ejection holes 15 are formed on the ship's bottom 5 in a manner such that they pass through the ship's bottom 5, there is a possibility of causing a degradation of the strength of the ship body depending on ways to form and arrange the air ejection holes 15. To handle this problem, the first embodiment suppresses the degradation of the strength of the ship body by forming the air ejection holes 15 on the bow side and the air ejection holes 15 on the center of the ship body in a separate manner. Details on the air ejection holes 15 are explained below with reference to FIG. 3 to FIG. 8.

The air ejection holes 15 constitute the air-ejection hole groups 30*a*, 30*b*, and 30*b* arranged in the ship width direction of the ship body 1. The air-ejection hole groups 30*a*, 30*b*, and 30*b* are formed on the ship's bottom 5 more than one (for example, three in the first embodiment). One of the three air-ejection hole groups 30*a*, 30*b*, and 30*b* is the center air-ejection hole group 30*a* formed at the center of the bow side in the ship width direction, and the rest two make the pair of the side air-ejection hole groups 30*b* and 30*b* formed at both sides of the center air-ejection hole group 30*a* on a stern side from the center air-ejection hole group 30*a*. Specifically, the center air-ejection hole group 30*a* is arranged on the bow side of the ship body 1, and the pair of the side air-ejection hole groups 30*b* and 30*b* are formed near the center of the ship body 1.

As shown in FIG. 3, the center air-ejection hole group 30*a* is formed to extend in the ship width direction at the center of the ship width direction around a center line S extending in a ship length direction that is the whole length direction of the ship body 1. Furthermore, the center air-ejection hole group 30*a* is formed on the ship's bottom 5 that makes a flat surface (see FIG. 4), and is arranged with the blower 16 at the bow side (see FIG. 1).

The pair of the side air-ejection hole groups 30*b* and 30*b* is formed to extend in the ship width direction, respectively formed on both sides across the center line S in the ship width direction. Furthermore, the pair of the side air-ejection hole groups 30*b* and 30*b* has the same length (same width) in the ship width direction as lengths L2, and is formed on the ship's bottom 5 that makes a flat surface (see FIG. 5). A length L1 (width) of the center air-ejection hole group 30*a* in the ship width direction is formed to be longer than the length L2 (width) of each of the side air-ejection hole groups 30*b* and 30*b*.

Further, the pair of the side air-ejection hole groups 30*b* and 30*b* is positioned outside the center air-ejection hole group 30*a* in the ship width direction, formed in a manner such that the center air-ejection hole group 30*a* and the pair of the side air-ejection hole groups 30*b* and 30*b* do not overlap with each other in the ship width direction. That is, outside edges of the center air-ejection hole group 30*a* and edges of the pair of the side air-ejection hole groups 30*b* and 30*b* on the center side are located at the same position, respectively, in the ship width direction. In other words, the center air-ejection hole group 30*a* and the pair of the side air-ejection hole groups 30*b* and 30*b* are arranged in a manner such that a center portion of air-ejection hole groups formed across the whole width of the ship's bottom 5 is moved to the bow side in the ship length direction.

Therefore, the length of each of the center air-ejection hole group 30*a* and the pair of the side air-ejection hole groups 30*b* and 30*b* can be shortened, compared to a case where the air-ejection hole groups are formed across the whole width of the ship body 1, making it possible to reduce a total opening area of the air ejection holes 15 formed in the ship width direction. With this configuration, it is possible to suppress the degradation of the strength of the ship body, that is, a longitudinal bending strength of the ship body 1 in the ship length direction.

Meanwhile, it is possible to take a total length of the center air-ejection hole group 30a and the pair of the side air-ejection hole groups 30b and 30b in the ship width direction substantially the same as a total length of a case where the air-ejection hole groups are formed across the whole width of the ship body 1. Therefore, it is possible to form the air bubble curtain on the ship's bottom of the ship body 1 with a satisfactory level.

The air chambers 22 provided corresponding to the center air-ejection hole group 30a and the pair of the side air-ejection hole groups 30b and 30b are explained below with reference to FIG. 4 and FIG. 5. The air chambers 22 include the center air chambers 22a corresponding to the center air-ejection hole group 30a (see FIG. 1 and FIG. 4) and the side air chambers 22b corresponding to the pair of the side air-ejection hole groups 30b and 30b (see FIG. 1 and FIG. 5).

As shown in FIG. 4, each of the center air chambers 22a is formed in a box shape of a rectangular cuboid with its longitudinal direction aligned with the ship width direction, being arranged in the ship width direction. By supplying the air from the blower 16 to the center air chambers 22a, the air is ejected from the center air-ejection hole group 30a to generate the air bubbles.

That is, the center air chambers 22a are respectively arranged corresponding to a plurality of air ejection holes 15 obtained by dividing the whole air ejection holes 15 in the center air-ejection hole group 30a into a plurality of parts. The branch supply pipes 21 are respectively connected to the center air chambers 22a at the centers of their ceiling portions.

Further, as shown in FIG. 5, each of the side air chambers 22b is formed in a box shape of a rectangular cuboid with its longitudinal direction aligned with the ship width direction, being arranged in the ship width direction, as the center air chambers 22a. The side air chambers 22b are divided into two parts with respect to the center line S. By respectively supplying the air from the blower 16 to the divided side air chambers 22b, the air is ejected from the pair of the side air-ejection hole groups 30b and 30b to generate the air bubbles. That is, the side air chambers 22b are respectively arranged corresponding to a plurality of air ejection holes 15 obtained by dividing the whole air ejection holes 15 in the side air-ejection hole groups 30b and 30b into a plurality of parts. As described above, the branch supply pipes 21 are respectively connected to the side air chambers 22b at the centers of their ceiling portions.

Details on the air ejection holes 15 of the air-ejection hole groups 30a, 30b, and 30b are explained below with reference to FIG. 6 to FIG. 8. The air ejection holes 15 are arranged in the ship width direction as described above, and each of the air ejection holes 15 is, for example, as shown in FIG. 6, formed in an elongated hole shape in the ship length direction. In this manner, by forming each of the air ejection holes 15 as the elongated hole, it is possible to suppress the degradation of the strength of the ship body, compared to a case where each of the air ejection holes 15 is formed in a round hole shape. The elongated hole can be, for example, an elliptical shape, an oval shape, or a rounded rectangular shape.

Each of the air ejection holes 15 is, for example, as shown in FIG. 7, formed in a round hole shape, being arranged in a staggered manner. By arranging the air ejection holes 15 in a staggered manner, it is possible to suppress the degradation of the strength of the ship body, compared to a case where the air ejection holes 15 are arranged in a line.

Furthermore, each of the air ejection holes 15 is, for example, as shown in FIG. 8, formed in an elongated hole shape in the ship length direction, being arranged in a staggered manner. With this configuration, it is possible to further suppress the degradation of the strength of the ship body, compared to the configurations shown in FIG. 6 and FIG. 7.

With the above configuration, it is possible to form the length of the center air-ejection hole group 30a in the ship width direction longer than the lengths of the side air-ejection hole groups 30b and 30b in the ship width direction. Therefore, because the air bubbles blown out from the center air-ejection hole group 30a can be broadened in the ship width direction of the bow side, it is possible to expand the area of forming the air bubble curtain formed at the bow side.

Furthermore, because the blower 16 can be arranged at the bow side of the ship body 1, it is possible to arrange the blower 16 near the center air-ejection hole group 30a. Because the length of the center air-ejection hole group 30a is longer than the length of each of the side air-ejection hole groups 30b and 30b in the ship width direction, the routing of the air supply path 17 (particularly, the branch supply pipes 21) for the center air-ejection hole group 30a becomes more complicated than the routing of the air supply path 17 for the side air-ejection hole groups 30b and 30b. However, because the distance between the blower 16 and the center air-ejection hole group 30a can be shortened, it is possible to simplify the routing of the air supply path 17 for the center air-ejection hole group 30a as the distance is shortened. Furthermore, because the length of each of the side air-ejection hole groups 30b and 30b in the ship width direction is short, it is also possible to simplify the routing of the air supply path 17 (particularly, the branch supply pipes 21) for the side air-ejection hole groups 30b and 30b.

In addition, because the center air-ejection hole group 30a and the pair of the side air-ejection hole groups 30b and 30b can be formed on the ship's bottom 5 that makes a flat surface, it is possible to achieve a uniformity in a thickness of the air bubble curtain formed on the ship's bottom 5.

Second Embodiment

Figure 9:
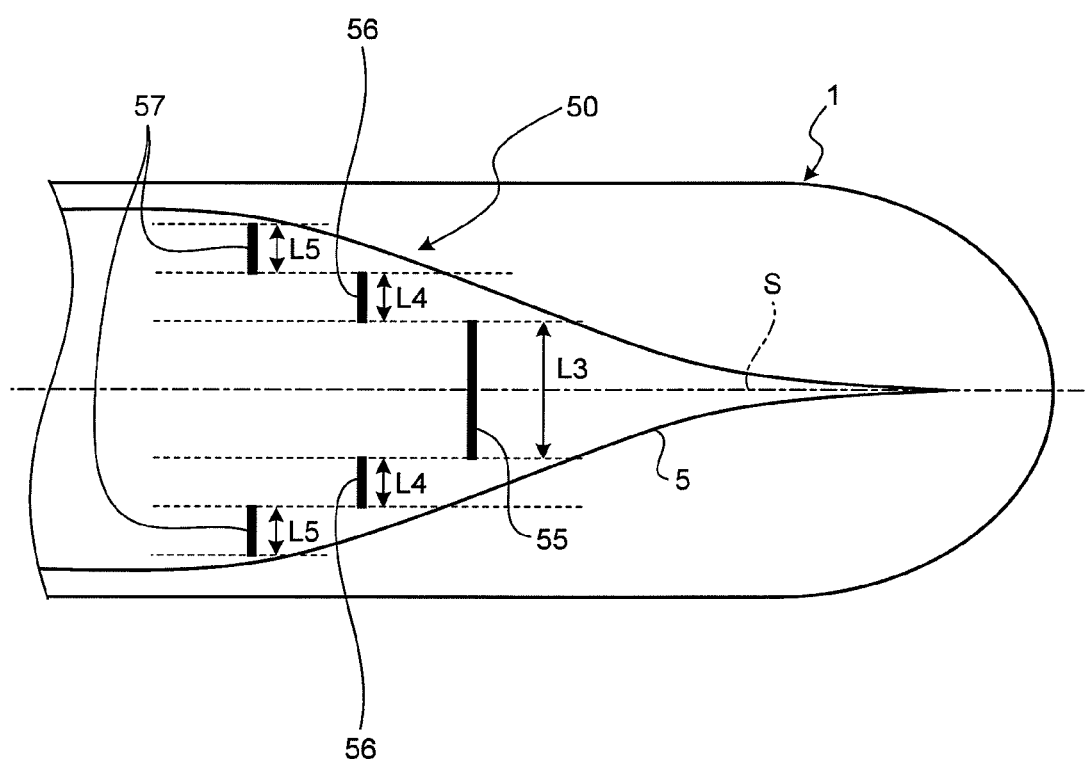
FIG. 9 is a bottom view schematically depicting a ship's bottom of a ship body having incorporated thereon a ship-body frictional resistance reducing device according to a second embodiment.

A ship-body frictional resistance reducing device 50 according to a second embodiment is explained below with reference to FIG. 9. To avoid redundant explanations, only parts that differ from above explanations are explained. FIG. 9 is a bottom view schematically depicting a ship's bottom of the ship body having incorporated thereon the ship-body frictional resistance reducing device according to the second embodiment. The ship-body frictional resistance reducing device 50 includes a center air-ejection hole group 55, a pair of first side air-ejection hole groups 56, and a pair of second side air-ejection hole groups 57.

Specifically, the center air-ejection hole group 55 is configured in the same manner as the first embodiment, which is formed at the center of the ship width direction on the ship's bottom 5 at the bow side of the ship body 1.

The pair of first side air-ejection hole groups 56 is formed at the stern side from the center air-ejection hole group 55 at both sides of the center air-ejection hole group 55 in the ship width direction. The pair of second side air-ejection hole groups 57 is formed at the stern side from the pair of first side air-ejection hole groups 56 at both sides of the pair of first side air-ejection hole groups 56 in the ship width direction.

A length L3 of the center air-ejection hole group 55 in the ship width direction is formed to be longer than a length L4 of each of the first side air-ejection hole groups 56 in the ship width direction and a length L5 of each of the second side air-ejection hole groups 57 in the ship width direction. The pair of first side air-ejection hole groups 56 has the same length (same width) in the ship width direction as lengths L4, and the pair of second side air-ejection hole groups 57 has the same length (same width) in the ship width direction as lengths L5. Each of the first side air-ejection hole groups 56 and each of the second side air-ejection hole groups 57 have the same width.

Further, the center air-ejection hole group 55, the pair of first side air-ejection hole groups 56, and the pair of second side air-ejection hole groups 57 are formed in a manner such that the center air-ejection hole group 55 and the pair of first side air-ejection hole groups 56 do not overlap with each other in the ship width direction and the pair of first side air-ejection hole groups 56 and the pair of second side air-ejection hole groups 57 do not overlap with each other in the ship width direction. That is, outside edges of the center air-ejection hole group 55 and edges of the pair of first side air-ejection hole groups 56 on the center side are located at the same position, respectively, in the ship width direction, and outside edges of the pair of first side air-ejection hole groups 56 and edges of the pair of second side air-ejection hole groups 57 on the center side are located at the same position, respectively, in the ship width direction.

Also with the above configuration, because the total opening area of the air ejection holes 15 formed in the ship width direction can be reduced, it is possible to suppress the degradation of the strength of the ship body. In addition, because the air bubbles blown out from the center air-ejection hole group 55 can be broadened in the ship width direction of the bow side, it is possible to expand the area of forming the air bubble curtain formed at the bow side.

Although the first side air-ejection hole groups 56 and the second side air-ejection hole groups 57 are configured with the same width in the second embodiment, alternatively, the length L4 of each of the first side air-ejection hole groups 56 in the ship width direction can be formed to be longer than the length L5 of each of the second side air-ejection hole groups 57 in the ship width direction.

Third Embodiment

Figure 10:
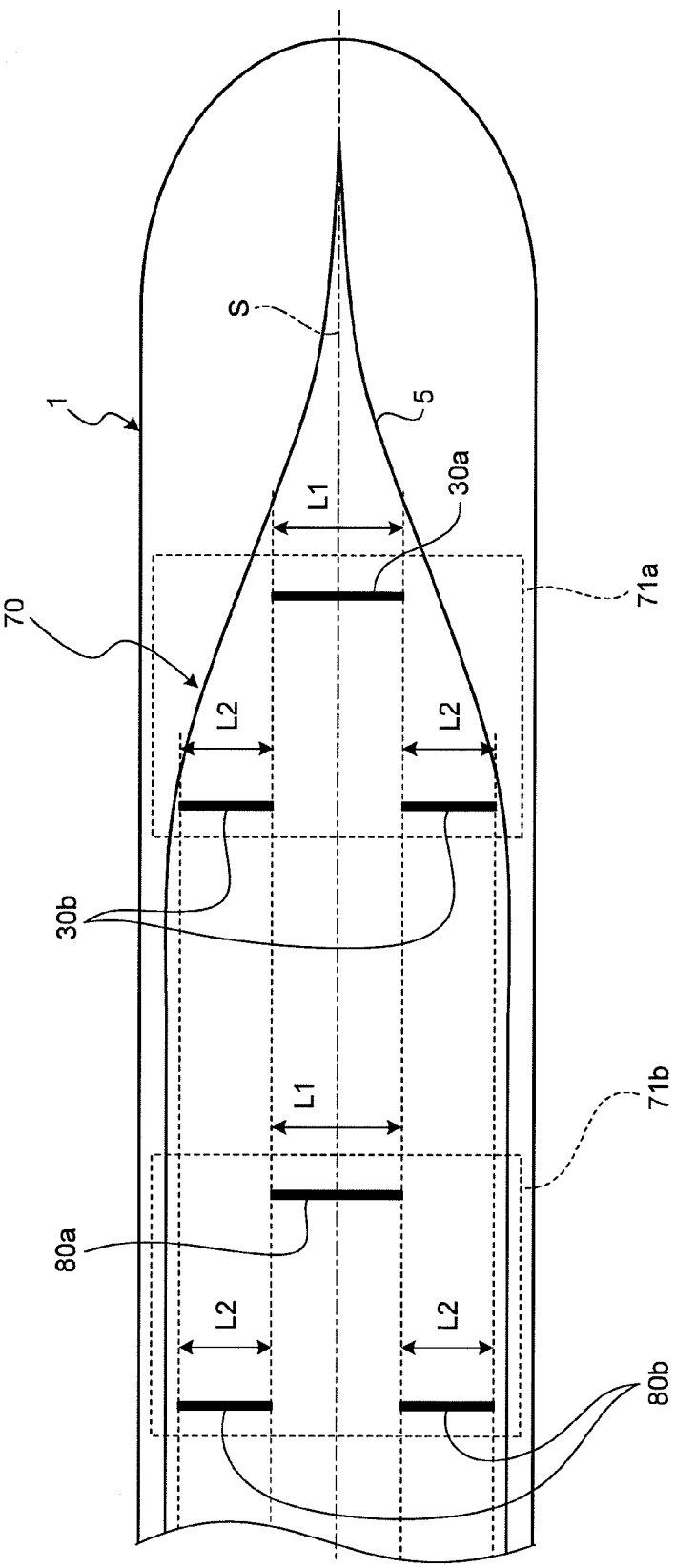
FIG. 10 is a bottom view schematically depicting a ship's bottom of a ship body having incorporated thereon a ship-body frictional resistance reducing device according to a third embodiment.

A ship-body frictional resistance reducing device 70 according to a third embodiment is explained below with reference to FIG. 10. To avoid redundant explanations, only parts that differ from above explanations are explained. FIG. 10 is a bottom view schematically depicting a ship's bottom of the ship body having incorporated thereon the ship-body frictional resistance reducing device according to the third embodiment. The ship-body frictional resistance reducing device 70 includes two sets of air ejection units 71a arranged in the ship length direction, with the center air-ejection hole group 30a, and a pair of side air-ejection hole groups 30b and 30b as a set of air ejection unit 71a.

Specifically, among the two sets of air ejection units 71a and 71b, the air ejection unit 71a is formed at the same position as in the case of the first embodiment, and the air ejection unit 71b is formed at the stern side from the air ejection unit 71a. That is, in the two sets of the air ejection units 71a and 71b, the air ejection unit 71a is configured with the center air-ejection hole group 30a and the pair of the side air-ejection hole groups 30b and 30b formed in the same manner as the first embodiment, and the air ejection unit 71b is configured with a stern-side center air-ejection hole group 80a arranged at the stern side from the center air-ejection hole group 30a and a pair of stern-side side air-ejection hole groups 80b and 80b arranged at the stern side from the pair of the side air-ejection hole groups 30b and 30b.

With the above configuration, it is possible to achieve the same effect as the first embodiment, and at the same time, even when it is hard to form the air bubble curtain on the ship's bottom 5 at the stern side of the ship body 1 due to the ocean current or turning of the ship body 1, it is possible to form the air bubble curtain on the ship's bottom 5 at the stern side of the ship body 1 in a satisfactory manner with air bubbles generated from the air ejection unit 71b at the stern side. Although the two sets of the air ejection units 71a and 71b are employed in the third embodiment, it is not limited to this method, but a plurality of air ejection units can be employed.

INDUSTRIAL APPLICABILITY

As described above, the ship-body frictional resistance reducing device according to the present invention is useful for a ship-body frictional resistance reducing device having a plurality of air ejection holes formed on a ship's bottom and particularly useful when suppressing degradation of the strength of a ship body.

The invention claimed is:

1. A ship-body frictional resistance reducing device for reducing frictional resistance of a sailing ship body by forming an air bubble curtain on a ship's bottom by generating air bubbles from a plurality of air ejection holes formed on the ship's bottom, the ship-body frictional resistance reducing device comprising a plurality of air-ejection hole groups formed on the ship's bottom, each of the air-ejection hole groups being configured with the air ejection holes arranged in a ship width direction of the ship body, wherein the air-ejection hole groups include at least a center air-ejection hole group formed at a center of the ship width direction at a bow side and a pair of side air-ejection hole groups formed at a stern side from the center air-ejection hole group at both sides of the center air-ejection hole group in the ship width direction, a length of the center air-ejection hole group in the ship width direction is formed to be longer than a length of each of the pair of side air-ejection hole groups in the ship width direction, and each of the pair of side air-ejection hole groups is arranged so as to be free from overlap with the center air-ejection hole group in the ship width direction, and the center air-ejection hole group is arranged to be closer to the bow side than the pair of side air-ejection hole groups.

2. The ship-body frictional resistance reducing device according to claim 1, further comprising:

an air supply source configured to supply an air to the air ejection holes; and an air supply path that connects the air supply source and the air ejection holes, wherein the air supply source is arranged at the bow side of the ship body.

3. The ship-body frictional resistance reducing device according to claim 1, wherein the ship's bottom of the ship body is formed in a flat surface, and the air-ejection hole groups are formed on the ship's bottom that is formed in the flat surface.

4. The ship-body frictional resistance reducing device according to claim 1, further comprising:

center air chambers that correspond to the center air-ejection hole group; and side air chambers that correspond to each of the pair of side air-ejection hole groups, wherein a number of the center air chambers is greater than a number of the side air chambers for each of the pair of side air-ejection hole groups.

* * * * *